United States Patent [19]

Quinn

[11] Patent Number: 4,596,507

[45] Date of Patent: Jun. 24, 1986

[54] LIFT TRUCK FORK WEAR INDICATING MEANS

[75] Inventor: Russell C. Quinn, Twinsburg, Ohio

[73] Assignee: Jos. Dyson & Sons, Inc., Eastlake, Ohio

[21] Appl. No.: 124,826

[22] Filed: Feb. 26, 1980

[51] Int. Cl.[4] .................................... B60P 1/46

[52] U.S. Cl. .................................... 414/785; 187/9 R; 116/208

[58] Field of Search ............... 187/9 R, 1 R; 116/208, 116/200; 188/214; 138/36; 414/785, 722; 403/27; 52/105; 248/542

[56] References Cited

U.S. PATENT DOCUMENTS

| | | | |
|---|---|---|---|
| 1,913,564 | 6/1933 | Raymond | 116/208 |
| 2,679,437 | 5/1954 | Pusztay | 187/9 R |
| 3,261,388 | 7/1966 | Kovac et al. | 116/208 |
| 3,430,393 | 3/1969 | Landes et al. | 52/105 |
| 3,982,647 | 9/1976 | Teutsch | 414/785 |

FOREIGN PATENT DOCUMENTS

| | | | |
|---|---|---|---|
| 1928215 | 2/1971 | Fed. Rep. of Germany | 116/208 |

*Primary Examiner*—Joseph J. Rolla
*Assistant Examiner*—Kenneth Noland
*Attorney, Agent, or Firm*—Frank B. Robb

[57] ABSTRACT

A fork lift vehicle lift fork having provisions to signal a user when wear of the fork on a surface or surfaces which are subject to wear, has progressed to an extent which may result in failure of the fork if subject to further continued use, such provisions including a plate element fastened adjacent a surface in such a way as to cause automatic release of the plate element when the wear has progressed to a predetermined extent, to assure visible notice of that fact, similar provisions being suitable for use in like manner to indicate wear of a separate surface subject to wear.

5 Claims, 6 Drawing Figures

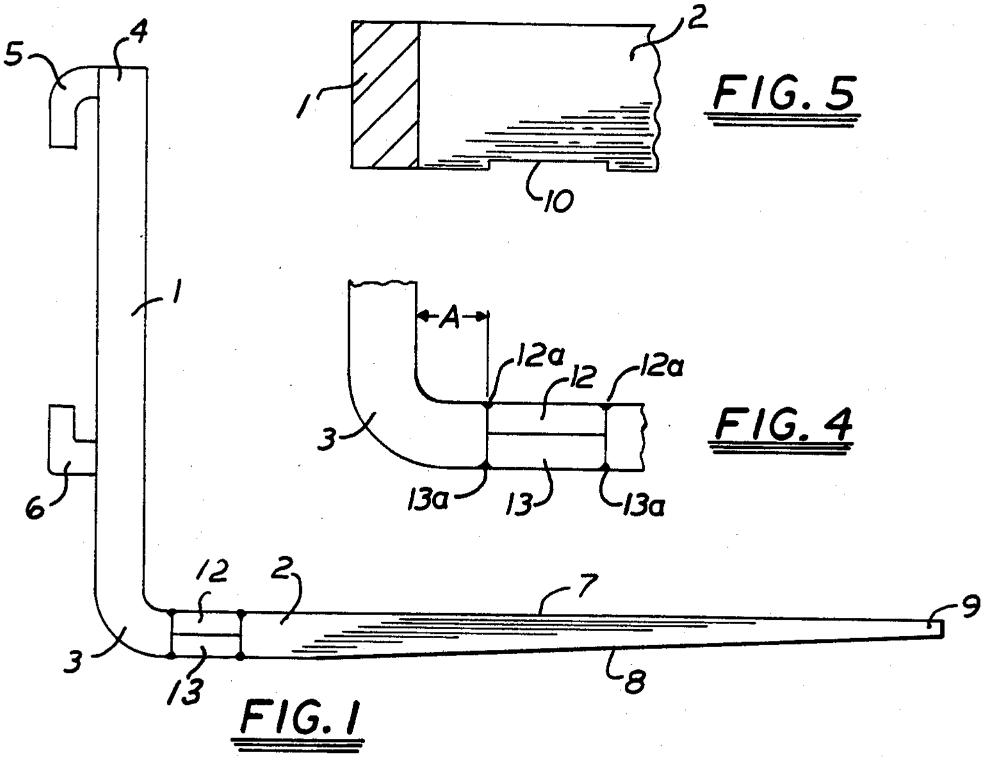
FIG. 5
FIG. 4
FIG. 1
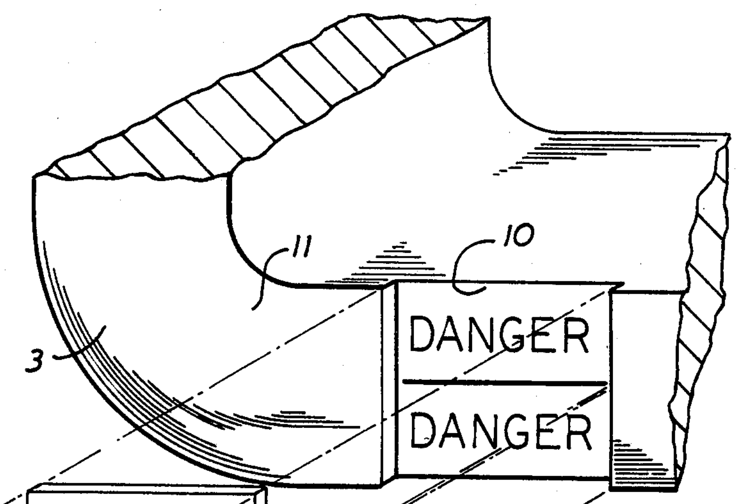
FIG. 2
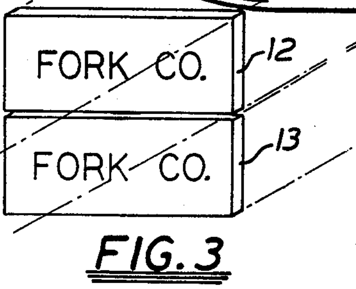
FIG. 3
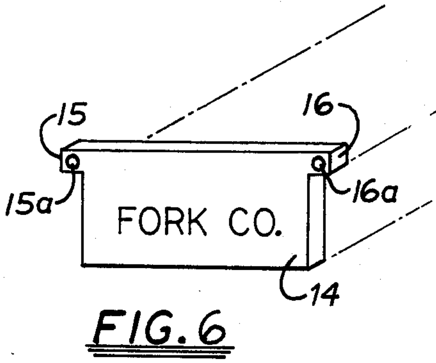
FIG. 6

LIFT TRUCK FORK WEAR INDICATING MEANS

BACKGROUND OF THE INVENTION

This invention relates to fork lift truck lift forks, which comprise a body having a supporting vertical section and a tine area or section, which are integral and which extend at right angles to one another, being of usual form, and because of the increasing use of lift forks, it has been necessary to impose increasing demands for safety of use of such elements in industry or wherever they are suitable for the purpose.

Under these circumstances, it is desirable to determine what safe periods of time the fork may be used over, and one way of indicating such safety, is to have some means of telling when wear of the fork has progressed to a point where it is no longer suitable for use.

As will be readily understood, wear of lift forks takes place primarily upon two surfaces, both being found on the tine section thereof, being the upper and lower surfaces primarily which affect the strength and life of such instrumentalities.

With that in mind therefore, it is the purpose of this invention to make possible the indication of the life expectancy and to indicate when the life of the fork has been really ended by use, resulting from wear.

DESCRIPTION OF THE INVENTION

With the foregoing in mind, it is a principal concept of this invention to provide simple means to indicate when a fork for a fork lift truck should be replaced or at least taken out of service for the reason that wear has taken place over certain areas which are critical to the strength and life of the fork.

The wear element, is largely found as taking place in the upper and lower surfaces of the tine section of the fork, and thus the elements hereof which indicate that such wear has taken place to a predetermined extent, are obviously valuable and useful in relation to determination of fork life.

It is contemplated by this invention that the means for indicating the wear has taken place, should be adapted for use to indicate wear of a number of different surfaces, and in this instance specifically the upper and lower surfaces of the tine section and this is effected hereby.

Further it is of value to provide certain signaling means which are readily observable and to thereby indicate visually and promptly the existence of a state of wear beyond which the fork should not further be used because of the liability to cause damage in use by failure thereof.

Turning now to a specific description of the invention, it is noted that the same is set forth in the specification appended hereto, being described in detail, and shown in the drawing, wherein:

FIG. 1 is a side view of a generally conventional fork indicating the portion thereof which is availed of for the indicating means hereof to establish that wear to a certain extent has taken place.

FIG. 2 is a fragmentary view in larger detail and in perspective showing a particular section of the fork and specifically the tine thereof which is availed of for the indicating means to be used therein.

FIG. 3 is a view of the indicating means themselves which are in the form of plate like elements, projected or as projected from the section of FIG. 2 in which they are positioned for indicating purposes.

FIG. 4 is again fragmentary view in side elevation, with the indicating means in position and suggesting the manner of fastening the same for the purposes hereof.

FIG. 5 is a top view fragmentary likewise showing the configuration of the fork to accept the indicating elements.

FIG. 6 is a view indicating a different form of element which may be used and as will be explained provide like function to the form of FIG. 3.

DETAILED DESCRIPTION OF THE DISCLOSURE

Turning now to FIG. 1 of the drawing, the fork for a fork lift vehicle is shown as comprising a member of usual form including a mounting portion 1 and a tine section 2 which are usually formed integrally as by forging with a heel area 3 providing the connection, and usually of bent configuration as a result of the forging process.

The mounting portion of the fork designated 1, includes a head 4 having a hook 5 thereon to connect the fork to a frame on the fork lift vehicle and a further hook 6 to assist in retaining the fork in position on such frame.

As will be understood, the tine section 2 of the fork, is generally tapered and is provided with an upper surface 7 and a lower surface 8 which extend from a relatively thin area 9 at the extremity to the heel 3, where the cross section is of substantial size to provide the necessary strength.

The indicating means of this invention are generally positioned near the heel 3 of the fork, and in the form disclosed, comprise a recess 10, formed in the side or edge portion of the tine section, the edge portion being designated 11, the recess in this instance being about one eighth of an inch deep for example and having indicia provided therein which indicate that a dangerous condition exists when these indicia are exposed.

Since the critical wear as before indicated, takes place over the bottom surface 8 and the upper surface 7 of the tine section, it will be understood that such wear will in most instances on forks, take place near the heel 3 thereof, and to that end the wear indicating means is located as before stated.

To carry out the purpose of this invention suitable means are availed of for covering the indicia which would otherwise indicate that a dangerous condition exists, plate members are provided which comprise signal elements, in this instance there being two such disclosed designated 12 and 13, which as indicated in FIG. 4 are positioned so as to cover the indicia 10 shown in FIG. 2.

In order to maintain these elements 12 and 13 in place, they are suitably fastened in the recess 10 by welding or brazing or other means, at their upper corner **12*a* and their lower corners 13*a*, the length of the weld vertically, having been calculated so that the lower surface 8 of the fork wears a sufficient amount the welds 13*a* at the lower corners of the element 13 are likewise worn away and the plate or signal element 13 will fall off or out of the recess 10**.

The indicia within the recess and positioned on the face thereof, will then be exposed and the fact that the signal element has fallen out of the recess will be quite readily apparent to the user of the machine.

The amount of wear can be predetermined, within close limits sufficiently close that wear beyond that, will cause the signaling element to fall out clearly indicating further use unsafe. It will be apparent that a similar arrangement of the signaling element 12 may be provided so that the wear on the upper surface 7, if continued to a point where the weld 12*a* is worn off or removed, the plate or indicating element 12 will likewise fall out of the position covering the indicia within the recess 10 also making quite apparent the fact that maximum wear has taken place and use of the fork would be dangerous if continued.

As disclosed, the recess 10 is preferably located rather close to the heel 3 of the fork, and as indicated at A may be approximately one inch from the face of the mounting position 1, to one edge of the recess, with the indicating or signaling element being of sufficient length and of suitable size to be noticeable in the ultimate analysis.

It will be understood that the effect of the recess on the strength of the fork is minimal if any and in any event can be accomodated for in initial manufacture by making the fork somewhat wider if necessary to allow for such recess.

FIG. 6 discloses a modified form of signaling element 14 which may have at its upper portion, the ears 15 and 16, which are of vertical height equivalent to the weld 12*a* for example of FIG. 4.

Thus if the element 14 is positioned as is the element 12, welding can be effected along the edge of the ears 15 and 16 to thereby retain the element in place and thus when wear has taken place sufficient to in effect remove that weld at the ends of the ears 15 and 16, the element 14 will in turn fall out of the recess 10.

It will be apparent that an element like 14, could replace the element 13 shown in FIG. 4 with the ears such as 15 and 16 at the lowermost extremity thereof.

It may also be reasonable to point out that the ears may have formed therein suitable openings such as 15*a* and 16*a*, in which drive pins could be entered and suitable openings in the recess provided to maintain the same in position so that when the drive pins have been removed by wear in effect, a similar reaction of the signaling element to fall out of position will take place and thereby reveal the dangerous condition existing.

An element of this same form could be fastened in the position of 13 in FIG. 4 for like effect by wear of the bottom surface 8 of the tine 2.

The vertical dimension of these signaling elements is not crucial, but sufficient size should be provided so that the indicia covered thereby will be noticeable when the elements are displaced.

I claim:

1. In fork lift vehicle lift fork construction, said fork having a mounting portion and a tine section, said section having a surface subject to wear which reduces the strength of said section and, means to indicate that a predetermined amount of wear has accurred, said means including a visible area of limited extent in a recess related to the surface so as to be noticeably affected by wear which takes place, and a signal element releasably fastened in the recess, the signal element is fastened in the recess by means positioned at an upper surface of the recess and adjacent to the surface subject to wear which release said element when wear of predetermined extent occurs at the surface subject to wear, whereby when the element is released to drop from the recess, the means to indicate the predetermined amount of wear is exposed.

2. Fork construction as claimed in claim 1, wherein the signal element is fastened in the recess by connections at complementary corners, said connections being worn away at the same time as wear takes place on the surface aforesaid, whereby the element is released to drop from the recess when wear of predetermined extent occurs.

3. Fork construction as claimed in claim 1, wherein more than one surface is subject to wear, a visible area is related in the same way to each said surface and is similarly, though separately affected by wear of each said surface, a signal element being provided for each surface and means are provided to fasten the same to an edge in a position related to the corresponding surface, to indicate wear thereof, the fastening being of a form in each instance that when a predetermined amount of wear has taken place, the element is released at its connection with the fork to indicate that such wear has occurred.

4. Fork construction as claimed in claim 1, wherein the visible area comprises a recess formed in one edge of the tine section, extending from the upper surface to a lower surface thereof, signal elements are fastened in the recess by fastenings which are worn simultaneously with the wear of the surfaces aforesaid, and each said element is thereby released when its fastening is worn to a predetermined extent.

5. Fork construction as claimed in claim 4, wherein each signal element comprises a late secured in the recess by fastenings located at areas adjacent the respective wear surfaces, whereby the wear effects ultimate release of said signal elements, to thereby indicate the wear status.

* * * * *